(12) United States Patent
Severin et al.

(10) Patent No.: US 9,382,827 B2
(45) Date of Patent: Jul. 5, 2016

(54) METHOD FOR REGENERATING A NITROGEN OXIDE STORAGE CATALYTIC CONVERTER AND A DEVICE FOR THIS PURPOSE (71) Applicant: FEV GmbH, Aachen (DE)

(72) Inventors: Christopher Severin, Aachen (DE); Thomas Wittka, Aachen (DE)

(73) Assignee: FEV GmbH, Aachen (DE)

( * ) Notice: Subject to any disclaimer, the term of this patent is extended or adjusted under 35 U.S.C. 154(b) by 0 days.

(21) Appl. No.: 14/032,227

(22) Filed: Sep. 20, 2013

(65) Prior Publication Data

US 2014/0083082 A1  Mar. 27, 2014

(30) Foreign Application Priority Data

Sep. 21, 2012  (DE) .................... 10 2012 018 673

(51) Int. Cl.
  *F01N 3/20* (2006.01)
  *F01N 3/08* (2006.01)
  *F01N 3/10* (2006.01)
  (Continued)

(52) U.S. Cl.
  CPC ............ *F01N 3/0885* (2013.01); *F01N 3/0842* (2013.01); *F01N 3/0871* (2013.01); *F01N 3/0878* (2013.01); *F01N 3/106* (2013.01); *F01N 9/00* (2013.01); *F01N 3/0814* (2013.01); *F01N 3/206* (2013.01); *F01N 11/002* (2013.01); *F01N 13/009* (2014.06); *F01N 2240/30* (2013.01); *F01N 2570/14* (2013.01); *F01N 2610/04* (2013.01); *F01N 2610/05* (2013.01); *F01N 2610/06* (2013.01); *F01N 2900/08* (2013.01);
  (Continued)

(58) Field of Classification Search
  CPC ..... F01N 3/0814; F01N 3/0842; F01N 3/106; F01N 3/206; F01N 11/002; F01N 13/009; F01N 2240/30; F01N 2570/14; F01N 2610/04; F01N 2610/05; F01N 2610/06; F01N 2900/08; F01N 2900/1411; F01N 2900/1602
  USPC ........... 60/274, 285, 286, 287, 288, 290, 295, 60/301, 303, 324
  See application file for complete search history.

(56) References Cited

U.S. PATENT DOCUMENTS 5,437,153 A * 8/1995 Takeshima et al. ............. 60/276
5,974,794 A * 11/1999 Gotoh et al. .................... 60/286
(Continued)

FOREIGN PATENT DOCUMENTS

DE  10341143 A1  4/2005
DE  102009016097 A1  10/2010

*Primary Examiner* — Jorge Leon, Jr.
(74) *Attorney, Agent, or Firm* — Dinsmore & Shohl LLP (57) ABSTRACT

Methods for regenerating a nitrogen oxide storage catalytic converter which is monitored to ensure that it exhibits a sufficient operating temperature for its regeneration, and a regeneration occurs at a point in time in which a flow rate (v) of an exhaust flow through the nitrogen oxide storage catalytic converter (6) has at least decreased in comparison to an immediately preceding time period. A vehicle for the operation in different operating ranges, having an exhaust post-treatment, exhibiting at least one nitrogen oxide storage catalytic converter and a reformer that provides for a reformate injection in an exhaust system prior to the nitrogen oxide storage catalytic converter, and having a stored regeneration program for the nitrogen oxide storage catalytic converter, which provides for a triggering of the regeneration when an operational state is detected in which no load is demanded of the internal combustion engine, preferably when the motor is at rest.

10 Claims, 3 Drawing Sheets

(51) Int. Cl.
*F01N 9/00* (2006.01)
*F01N 13/00* (2010.01)
*F01N 11/00* (2006.01)

(52) U.S. Cl.
CPC . *F01N 2900/1411* (2013.01); *F01N 2900/1602* (2013.01); *Y02T 10/47* (2013.01)

(56) References Cited

U.S. PATENT DOCUMENTS

| | | | |
|---|---|---|---|
| 5,992,142 A * | 11/1999 | Pott | 60/274 |
| 2004/0194452 A1 * | 10/2004 | Inoue et al. | 60/286 |
| 2006/0260297 A1 * | 11/2006 | Koch | 60/286 |
| 2008/0314020 A1 * | 12/2008 | Hoard et al. | 60/274 |
| 2009/0019836 A1 * | 1/2009 | Nagaoka et al. | 60/285 |
| 2009/0205323 A1 * | 8/2009 | Tsujimoto et al. | 60/286 |
| 2010/0050599 A1 * | 3/2010 | Kopp | 60/274 |
| 2010/0257847 A1 * | 10/2010 | Nishioka et al. | 60/286 |
| 2011/0314794 A1 * | 12/2011 | Geyer | 60/274 |
| 2012/0117947 A1 * | 5/2012 | Gonze et al. | 60/274 |
| 2013/0031890 A1 * | 2/2013 | Shovels et al. | 60/274 |
| 2013/0074474 A1 * | 3/2013 | Gonze et al. | 60/274 |
| 2013/0186064 A1 * | 7/2013 | Mehta | 60/274 |

* cited by examiner

METHOD FOR REGENERATING A NITROGEN OXIDE STORAGE CATALYTIC CONVERTER AND A DEVICE FOR THIS PURPOSE

CROSS-REFERENCE TO RELATED APPLICATIONS

This application claims priority of German Patent Application DE 10 2012 018 673.8 filed on Sep. 21, 2012, which is incorporated by reference herein in its entirety.

FIELD OF THE INVENTION

The present invention concerns a method for regeneration of a nitrogen oxide storage catalytic converter, used in a vehicle, as well as a device suited for this purpose.

BACKGROUND OF THE INVENTION

It is known that in order to comply with limit values with respect to exhaust components, a regeneration of a nitrogen oxide storage catalytic converter is necessary. Frequently, a rich combustion operation condition is used within the internal combustion engine for this, wherein, by means of the further conveyance of unburned hydrocarbons as far as the storage catalytic converter, its regeneration enabled. Another possibility of providing for a regeneration of a nitrogen oxide storage catalytic converter consists of the use of an injector, which is disposed externally to an exhaust system, for the supplying of reduction agents. There is also the possibility of using a reformer for supplying a reduction agent for the regeneration of the nitrogen oxide storage catalytic converter.

SUMMARY OF THE INVENTION

The objective of the present invention is to be able to reliably ensure the use of the nitrogen oxide storage catalytic converter, even in such situations in which the internal combustion engine is not running.

This objective is attained with a method and a vehicle having the features described herein. The features arising from the respective coordinate independent Claims are only to be regarded, however, as a formulation proposal in the scope of the present invention. One or more of the features given there can be replaced by one or more of the other features from the description as well as from the remaining disclosure of the invention.

A method for the regeneration of a nitrogen oxide storage catalytic converter is proposed, which is used in a vehicle that is operated in different operating ranges, wherein, preferably, the nitrogen oxide storage catalytic converter is monitored to ensure that it is at a sufficient operating temperature for its regeneration, and a regeneration occurs at a point in time in which a flow rate of an exhaust flow through the nitrogen oxide storage catalytic converter has at least decreased in comparison to a preceding time period, in particular, has at least significantly decreased.

The preceding time period can, for example, can be less than 240 seconds prior to this. Preferably, this separation up until the comparison lies in a range that is less than 180 seconds. By this means, for example, a state following the shutting off of an internal combustion engine can also be monitored.

Preferably, a gaseous reformate is used for the regeneration. The reformate is generated in a gaseous state, for example, and as such, is also dosed to the exhaust system in a gaseous state. A flushing gradient, for example when an internal combustion engine is at rest, or, respectively, a correct flow direction in the reformate line, is ensured, for example, by means of a fresh air supply by the reformer. When the internal combustion engine is at rest, due to the gaseous aggregate state of the reformate, no flow dynamic precautions need to be met. According to a further development, only a low-pressure exhaust return valve, for influencing the flow direction in the exhaust system in a targeted manner, is used.

According to one design, it is provided, for example, that a reformer for an energy generating device of the vehicle exhibits its own air pump, which pumps a reformate gas through the nitrogen oxide storage catalytic converter. As a result, a regeneration of the nitrogen oxide storage catalytic converter can also occur, for example, when the energy generating device, such as an internal combustion engine, for example, is at rest.

A reformate generation preferably occurs with the existing fuel, preferably diesel fuel. The reduction agent source is then conveyed with the fuel, in the same manner as with a rich combustion operation condition of the internal combustion engine.

Preferably, a temperature monitoring of the nitrogen oxide storage catalytic converter is coupled with the method for regeneration. By this means, for example, it is possible to provide for the blocking of a regeneration if the temperature monitoring determines that even with a gas flow supplied for regeneration, the necessary temperature for this is however no longer present at the nitrogen oxide storage catalytic converter. This can affect the entire, as well as only a portion of, the nitrogen oxide storage catalytic converter. By way of example, the temperature is measured directly at one or more measurement locations, for example, on the nitrogen oxide storage catalytic converter. There is also the possibility that the temperature monitoring exhibits an indirect temperature determination of the nitrogen oxide storage catalytic converter. In this manner, a temperature monitoring may be provided for in another component in the exhaust system, by means of which the respective temperature at the nitrogen oxide storage catalytic converter is derived from the temperature determined there. Furthermore, there is the possibility that the temperature monitoring first allows the regeneration only if a sufficient temperature is present.

It is particularly preferred when the comparison regarding the flow rate is to a directly preceding time period. This means that the comparison occurs within a few seconds, preferably within 5 seconds, preferably within less than 5 seconds, particularly within two seconds and less. This enables, for example, even with only short periods of driving operating states, a regeneration to be triggered. Thus, the vehicle may be, for example, in a coasting state. In this case, a coasting state means that when the foot is removed from the gas pedal, the clutch is no longer engaged, and thus an internal combustion engine braking does not occur. If, however, the brake pedal is lightly pressed, or if, with the paddle on the steering wheel for operating the manual transmission, a downshifting is executed, the clutch is re-engaged, and braking occurs by means of the internal combustion engine.

A sufficient operating temperature for regeneration is dependent, for example, on which reduction agent is used for regeneration. As such, there is the possibility that with the use of a reduction agent having, for example, CO, HC and H2, a regeneration can already occur at approx. 250° C. This temperature is, in particular, the minimum temperature for regeneration with the use of a motor-internal regeneration, meaning, for example, by means of intentional rich combustion operation condition. If instead, a reformate is used, for example, this reformate may exhibit a high quality, such as a higher H2/CO concentration. It is preferred in this case that the H2/CO concentration be provided in a range that is greater that 15% by volume, in particular, is greater than 18% by volume, respectively. Furthermore, it is emphasized that the least possible amount of HC be used in the reformate, and in particular, to supply a reformate containing no HC. In this case, a minimum regeneration temperature may lie, preferably, below 200° C. This light-off temperature, starting at which the regeneration of the nitrogen oxide storage catalytic converter is enabled, is thus taken into consideration, preferably such that it can be pre-selected, depending on the regeneration agent that is supplied. This can, for example, occur by means of a control, or a regulation, respectively. If, for example, it is provided that a supplying of reformate, which is also possible by means of an application of rich combustion operation condition within the internal combustion engine, can be possible, depending on a selection from both, if a sufficient operating temperature for the nitrogen oxide storage catalytic converter is assumed, and thus a regeneration can be carried out at all. For example, a rich combustion operation condition can occur if the supplying of a reformate as the reduction agent has been impaired.

The determination of a sufficient operating temperature for regeneration can occur by means of another design, for example, by means of monitoring the temperature in the nitrogen oxide storage catalytic converter directly. For this, it may be provided, for example, that one or more temperature sensors are disposed on or in the nitrogen oxide storage catalytic converter. Furthermore, one or more temperature sensors can be disposed up or downstream of the nitrogen oxide storage catalytic converter. By way of example, it is also possible to determine a temperature of the nitrogen oxide storage catalytic converter by calculating the amount of heat flowing through the system. Another design provides that, based on the knowledge of a heating behavior of the nitrogen oxide storage catalytic converter, a time allowance is selected, only after which a regeneration is first allowed to take place. This prevents a regeneration being able to be triggered at a point in time in which the nitrogen oxide storage catalytic converter does not yet exhibit a sufficient light-off temperature in at least one or more regions of the body of the catalytic converter. For this, it is provided, for example, that a further heating of downstream regions of the body of the catalytic converter occurs as a result of the completed regeneration therein, and the thus released heat. In this case, the respective light-off temperature is also reached more quickly for these regions, and as a result, they can also be regenerated. Another design provides, for example, that a sufficient operating temperature for regeneration is first assumed if the entire storage catalytic converter has reached a light-off temperature.

Preferably, a sufficient operating temperature for regeneration is ensured in that, first after fulfilling at least one prerequisite, a corresponding regeneration is permitted. For this, the motor control unit, for example, may include a timer, by means of which, directly after a start-up of the internal combustion engine disposed in the vehicle, it is checked when the internal combustion engine was last operated. If this was not very long ago, then the motor control device may exhibit the implemented assumption that the internal combustion engine is still at an operating temperature, and likewise, the exhaust system is at a sufficiently warm operating state. As a result, it can be assumed, for example, that the light-off temperature of the nitrogen oxide storage catalytic converter is immediately and directly reached after the start-up of the internal combustion engine. In this case, the regeneration can be enabled immediately. Furthermore, there is the possibility that a command is stored in the motor control unit requiring an operating time to be cycled through that has been adjusted to the time elapsed since the last operation of the vehicle, based on which it can be assumed that after this time has elapsed, the nitrogen oxide storage catalytic converter has been heated to a sufficient light-off temperature.

It is furthermore provided that the regeneration occurs at a point in time when the flow rate of exhaust through the nitrogen oxide storage catalytic converter is lower than during a previous time period. A decreasing of the flow rate has the advantage that a higher degree of regeneration can be obtained. In particular, waiting for small spatial speeds within the nitrogen oxide storage catalytic converter enables a regeneration efficiency that is increased in the regeneration, and a desorption of nitrogen oxides, and furthermore, a possible slip of the reduction agent, such as CO or HC, is reduced, in particular, is prevented. The increased efficiency during lower spatial speeds also enables a decrease in the use of reduction agents. If no rich combustion operation condition of the internal combustion engine is necessary for the regeneration of the storage catalytic converter, the fuel consumption is also decreased as a result of the advantage obtained in terms of the efficiency of the fuel consumption during a more efficient operation of the internal combustion engine. In particular, with a rich combustion operation condition by means of additional dosing necessary for this, fuel consumption is kept low in this manner.

According to one design, it is provided, for example, that a lower spatial speed can be determined by means of measuring the flow. For this, at least one suitable flow sensor can be disposed in the exhaust path, for example. There is also the possibility that a spatial speed, in particular in the region of the nitrogen oxide storage catalytic converter, can be determined by means of an evaluation of parameters present in the motor control unit, for example. If, for example, this speed falls below a pre-determinable limit, a regeneration is triggered, to the extent that one or more other prerequisites, preferably also for the regeneration, would indicate that this is necessary. For this, in particular, a monitoring of the load state of the nitrogen oxide storage catalytic converter, for example, may belong to this category of prerequisites. Aside from a measurement of the speed, a change in speed can also be detected or determined. The change in speed may, for example, lead to a conclusion as to how significant the decrease or increase in speed is. Thus, a change in speed detected, for example, over a certain time period, may serve as the trigger for a regeneration.

For the speed sensor, a volumetric flow meter, a hot-wire sensor, a hot film sensor, or other suitable sensors, for example, may be used. Furthermore, there is the possibility that an exhaust mass flow in the motor control unit is known by means of a fresh air flow and by means of a fuel mass flow.

Another design provides, for example, for a regeneration occurring at such operating points in which it can be assumed that a lower spatial speed is present than at other operating points. According to one design, it is provided here, for example, that a regeneration occurs when the internal combustion engine is idling. Another design provides that an assumption of a lower, or no spatial speed is assumed when an internal combustion engine is at rest. This can, for example, occur in a internal combustion engine standstill phase during start-stop mode, or during so-called coasting mode. A resting phase of the internal combustion engine can, however, likewise also be provided for in a parallel hybrid vehicle, or another hybrid vehicle, if, for example, a design of the drive enables a decoupling of the internal combustion engine. In this case, other resting phases of an electric motor, for example, may be used for the regeneration. This is possible, for example, during a regenerative braking, or during a possible descent of a hill, or while coasting.

It is preferred that the regeneration agent be supplied in a gaseous state for regeneration when the internal combustion engine is at rest. The regeneration agent can thus flood the nitrogen oxide storage catalytic converter, or flow through it slowly, respectively. Due to the temperatures present in the nitrogen oxide storage catalytic converter, an implementation, and thus regeneration, can be enabled at or above the light-off temperature. In particular, start-stop systems may also be used for regeneration, in particular when a reformer is used for generating the reduction agent independently of the operating manner of the internal combustion engine. In particular, the use of the reformer for generating the regeneration agent also enables a generation of regeneration agent, adjusted such that, also at lower temperatures, a sufficient regeneration is enabled.

Furthermore, it is provided, according to a further development, that a possible reduction agent slip is prevented in that a re-oxidation is enabled for a catalytic converter having a preferably larger oxygen reservoir, disposed downstream of the nitrogen oxide storage catalytic converter. For this, this catalytic converter is disposed, regarded in the direction of flow, directly downstream of the nitrogen oxide storage catalytic converter. Another design provides, for example, that for directing the flow while the internal combustion engine is at rest, an exhaust counter-pressure valve is closed, that is located prior to the storage catalytic converter. As a result, a flow direction through the nitrogen oxide storage catalytic converter can be created, which in turn enables its regeneration by supplying the reformate or regeneration agent. For this, the nitrogen oxide storage catalytic converter is preferably disposed downstream of the low-pressure exhaust return valve, seen from the direction of the exhaust flow.

According to another concept of the invention, a vehicle is proposed which is intended for operation in different operating ranges, and is provided with an exhaust post-treatment, which exhibits at least one nitrogen oxide storage catalytic converter and one reformer. The reformer exhibits a reformate dosage in an exhaust system, prior to the nitrogen oxide storage catalytic converter. Furthermore, the vehicle exhibits a stored regeneration program for the nitrogen oxide storage catalytic converter, which provides for a triggering of the regeneration when an operating state has been detected in which no load is demanded of the internal combustion engine, preferably when the internal combustion engine is at rest. A vehicle of this proposed type can preferably be implemented with the use of a start-stop or coasting mode, but can also be implemented in vehicles, for example, in which a regeneration occurs when the internal combustion engine is at rest after the vehicle has been parked. If a storage catalytic converter bypass is available, a regeneration, which is independent of the internal combustion engine, is also possible in the normal operation as well as with thrust.

Preferably, the vehicle is equipped with a reformer such that a reduction agent generation, independent of the internal combustion engine, can be used in order to supply a reduction agent for regenerating the nitrogen oxide storage catalytic converter, at least when the internal combustion engine is at rest. A further supplying of the reduction agent, during the operation of the internal combustion engine as well, is also possible. In particular, the use of the reformer allows for an additional rich combustion operation condition for regenerating the nitrogen oxide storage catalytic converter by means of re-dosing, according to one design, for example, to be eliminated. A regeneration program can therefore, for example, provide for an implementation of the regeneration without the internal combustion engine being in rich combustion operation condition mode. This reduces the wear to the internal combustion engine, because in order to regenerate the storage catalytic converter, the optimal low fuel consumption mode does not need to be abandoned. Another design provides for a regeneration program in which a rich combustion operation condition is implemented in addition to using a regeneration agent from a reformer.

It is preferably provided that a regeneration occurs when the nitrogen oxide storage catalytic converter is at a temperature of less than 200° C. For this, it is provided that the light-off temperature, in particular, is adjusted to the regeneration agent in the scope of the regeneration program in the vehicle. The regeneration program can also provide that a triggering of the regeneration must occur when an idle mode has been detected. If, for example, the vehicle is equipped with a detector system, which enables longer periods of standing still, for example at a traffic light or suchlike, to be detected, then a standstill of the vehicle, or a internal combustion engine standstill adjusted for this, respectively, can be made use of. In particular, there is then the possibility of differentiating between internal combustion engine standstills or vehicle standstills that are too short, on one hand, and sufficiently long standstills, which are suitable for a regeneration of the nitrogen oxide storage catalytic converter.

Another design provides, for example, for a secondary injection when the internal combustion engine is idling, for regeneration, wherein a bypass to the nitrogen oxide storage catalytic converter is used. This prevents, for example, the nitrogen oxide storage catalytic converter from overheating during the regeneration due to a rich combustion operation condition mixture that is too thick.

Further advantageous designs and developments of the invention can be derived from the following figures. The designs and features arising from the individual figures are not, however, limited thereto. Moreover, one or more of these features can be linked to one or the other features from other designs, as well as from the above description, to obtain other designs. They show:

BRIEF DESCRIPTION OF THE DRAWINGS

FIG. 1 a first schematic view of a vehicle having a schematically depicted exhaust treatment, FIG. 2 a second design of an exhaust treatment in a schematic depiction, FIG. 3 an exemplary depiction of an operating mode, in which a regeneration occurs in a state of an internal combustion engine in a range in which it is not subjected to a load, such as an idle mode, for example, and FIG. 4 another schematic depiction of an operating mode in a vehicle, wherein said vehicle is at a standstill, and an internal combustion engine has been shut off, wherein a regeneration is initiated when the internal combustion engine is shut off.

DETAILED DESCRIPTION OF THE INVENTION

Figure 1:
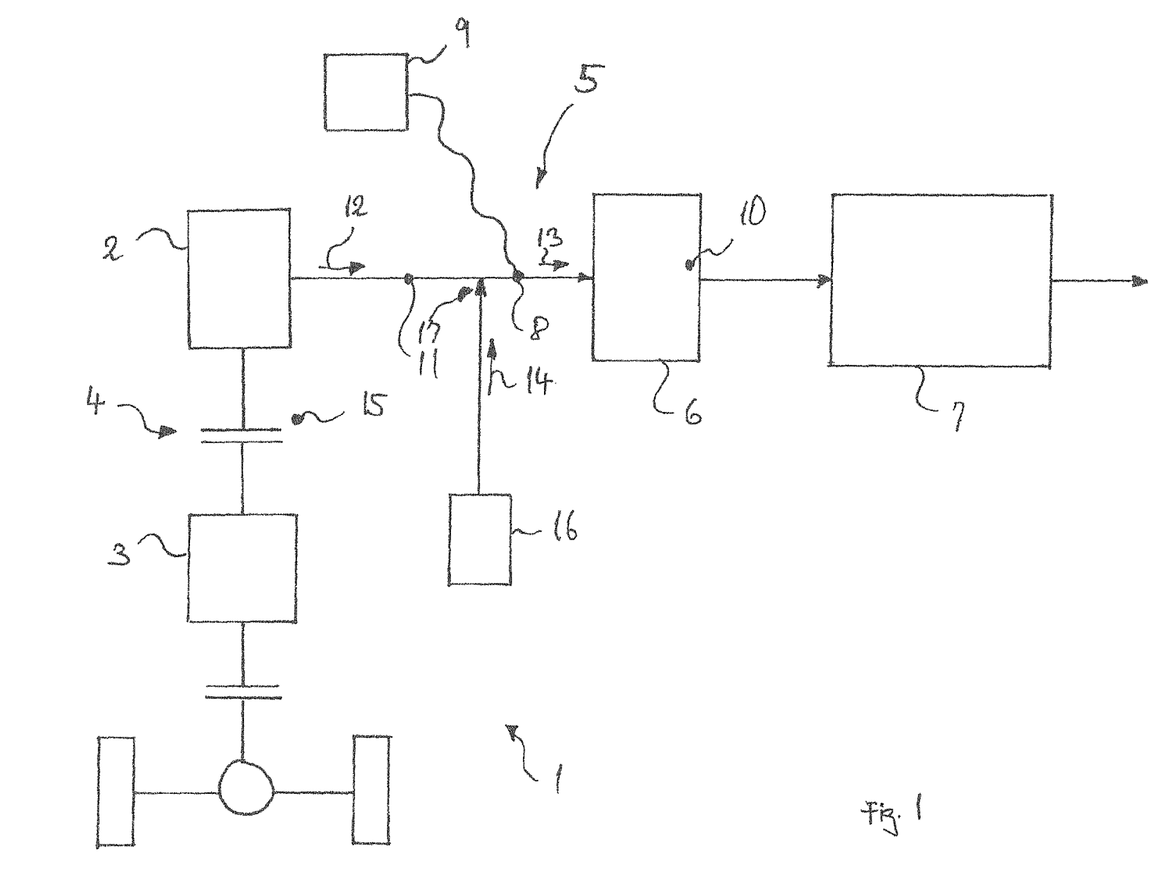

FIG. 1 shows, in a schematic view, an exemplary design of a vehicle 1. The vehicle 1 is preferably a land vehicle, preferably a street vehicle. This can be a passenger car, or a truck. The vehicle is designed as a hybrid vehicle, for example, wherein both an internal combustion engine 2 as well as an electric motor 3 are coupled to one another, by means of a clutch 4, for example. The schematic depiction provides no actual structure of a drive train, but instead, serves solely for the schematic depiction thereof. For this reason, in the case of a drive concept, other than a hybrid solution, for example, via the depicted combination of an internal combustion engine 2 and an electric motor 3, the sole use of an internal combustion engine or another drive concept having various drive components, in which an exhaust post-treatment is necessary in an exhaust system 5, is also possible. A nitrogen oxide storage catalytic converter 6, for example, and a diesel particle filter 7, downstream thereof, are disposed in the exhaust system 5. This sequence is referred to a motor proximity system. A reversed sequence, i.e. the diesel particle filter with a nitrogen oxide storage catalytic converter located downstream thereof, can also be used. This sequence is referred to as an underbody system. Other exhaust cleaning components can also be disposed in the exhaust system 5. For example, a lambda sensor 8 is disposed in front of the nitrogen oxide storage catalytic converter. This is connected, for example, to an electric or motor control unit 9. The motor control unit 9 is preferably also capable of monitoring the nitrogen oxide storage catalytic converter 6. For example, at least one temperature sensor 10 is disposed in or on the nitrogen oxide storage catalytic converter 6. The temperature sensor 10 transmits its temperature data to the motor control unit 9. By this means, the motor control unit 9 knows whether the nitrogen oxide storage catalytic converter 6 is already at a sufficient temperature, such that the light-off temperature has been exceeded, and in theory, a regeneration can be enabled. Furthermore, there is the possibility that, for example, a temperature can be detected by means of the lambda sensor 8. By means of a potential mass flow sensor 11, or a speed sensor, which is disposed, for example, in the exhaust system 5, the motor control unit 9 can obtain data regarding an exhaust flow 12. The exhaust flow 12 is indicated schematically by an arrow. The exhaust flow 12 can be supplied with a reduction agent 13, by means of a re-dosing, for example, of fuel in the internal combustion engine 2. Another design provides, for example, for a reformate 14 to be supplied as the reduction agent 13. The reduction agent 13, or the reformate 14, respectively, are each indicated schematically by an arrow. The reduction agent 13, in the form of a reformate 14, for example, or as a lubricated exhaust flow 12, flows into the nitrogen oxide storage catalytic converter. There, as soon as this exhibits a temperature that is higher than the light-off temperature, the reduction agent, preferably in the form of the reformate, is used as the direct chemical reaction partner in the NOx reduction reaction. As proposed, the supply point in time for the reduction agent, or reformate dosing of the reformate 14, respectively, is awaited in the exhaust system 5, preferably by means of the motor control unit 9, such that the exhaust flow 12 exhibits a flow rate having a significant deceleration in comparison with a previous time range lying shortly before it. As a result, the reduction agent 13 flows through the nitrogen oxide storage catalytic converter 6, likewise with a very low flow rate. As a result, a longer time period is available in which to carry out the nitrogen oxide reduction reaction. The reduction agent has a longer dwell time within the nitrogen oxide storage catalytic converter 6. As a result, it is also possible, in particular, that a given quantity of the reduction agent 13, adjusted to the exhaust flow rate, can be supplied, with respect to an optimization of the implementation in the nitrogen oxide storage catalytic converter 6. Thus, a supplying of the reduction agent, for example, can be provided at a point in time on the part of the motor control unit 9, in which the internal combustion engine 2 is, for example, at rest. This internal combustion engine standstill may occur, for example, in the framework of a start-stop mode. Another design is then possible, for example, with the hybrid vehicle depicted herein, when the clutch 4 is disengaged, the internal combustion engine 2 is shut off, and the vehicle rolls such that it is basically coasting. A shutting off of the internal combustion engine 2 in the framework of the hybrid drive can also be used such that upon shutting off, a regeneration occurs, while the powering of the vehicle is carried out by means of the electric motor 3. For this, the motor control unit 9 can likewise be made use of.

For the implementation of the regeneration, it can be provided for, for example, that the motor control unit 9 can also detect an internal combustion engine standstill. This detection can, for example, also be enabled in that a sensor 15 is provided, which leads to a conclusion that the internal combustion engine is at a standstill, or at least in another operating state in which the exhaust flow is extremely low, for example, when idling. The sensor 15 can thus, for example, be disposed at least adjacently to the clutch 4, and when a disengagement from the internal combustion engine 2 is detected, and the electric motor 3, when powered exclusively by the electric motor 3, initiates the electric motor standstill, on one hand, and on the other hand, serves as a monitor for the motor control unit 9. The sensor 15 can, however, also be disposed elsewhere in the vehicle, for example, in the region of a clutch, a start-up device, or ignition device, or other location.

The motor control unit 9 is preferably able to control, regulate, or otherwise operate, not only the internal combustion engine 2, but also the electric motor 3, in the form of a superordinated entity, in particular, also taking into account further control devices, that are, for example, disposed locally on the internal combustion engine 2, or the electric motor 3. It is also possible to provide for a single control device, responsible for the exhaust treatment, and in particular, for the reformate preparation and dosing as well. In this manner, a reformer, as well as a reformate dosing unit 17 may be used, for example, as is the case in DE 10 2009 016 097, for example. The production of the reformate, the supplying of the reformate, the reformer itself, its operation, as well as other details with regard to a nitrogen oxide storage catalytic converter is fully described in the scope of this disclosure. The reformate can, for example, be generated in the reformer by means of fuel from the fuel tank.

A regeneration program can, for example, be stored in the motor control unit 9. There is, however, also the possibility that the actual regeneration program is stored in its own control device, and the motor control unit 9 supplies the other control unit with only the data, such as the triggering point in time, for example. According to one design, it is provided, for example, that the regeneration program is adaptive. Depending on the operating manner, and thus, the driving manner of the vehicle, heating at different speeds of the nitrogen oxide storage catalytic converter, but also, in city traffic, for example, different accelerations, braking and standstills can occur. By means of an adaptive learning potential, consideration can be made for this, and a regeneration program can thus be specifically adapted thereto. If, for example, a vehicle is primarily operated in city traffic, and thus frequently used in start-stop mode, the regeneration program must take this into account. The same is likewise the case if the vehicle, in contrast to this, is substantially used for long distance travel.

Figure 2:
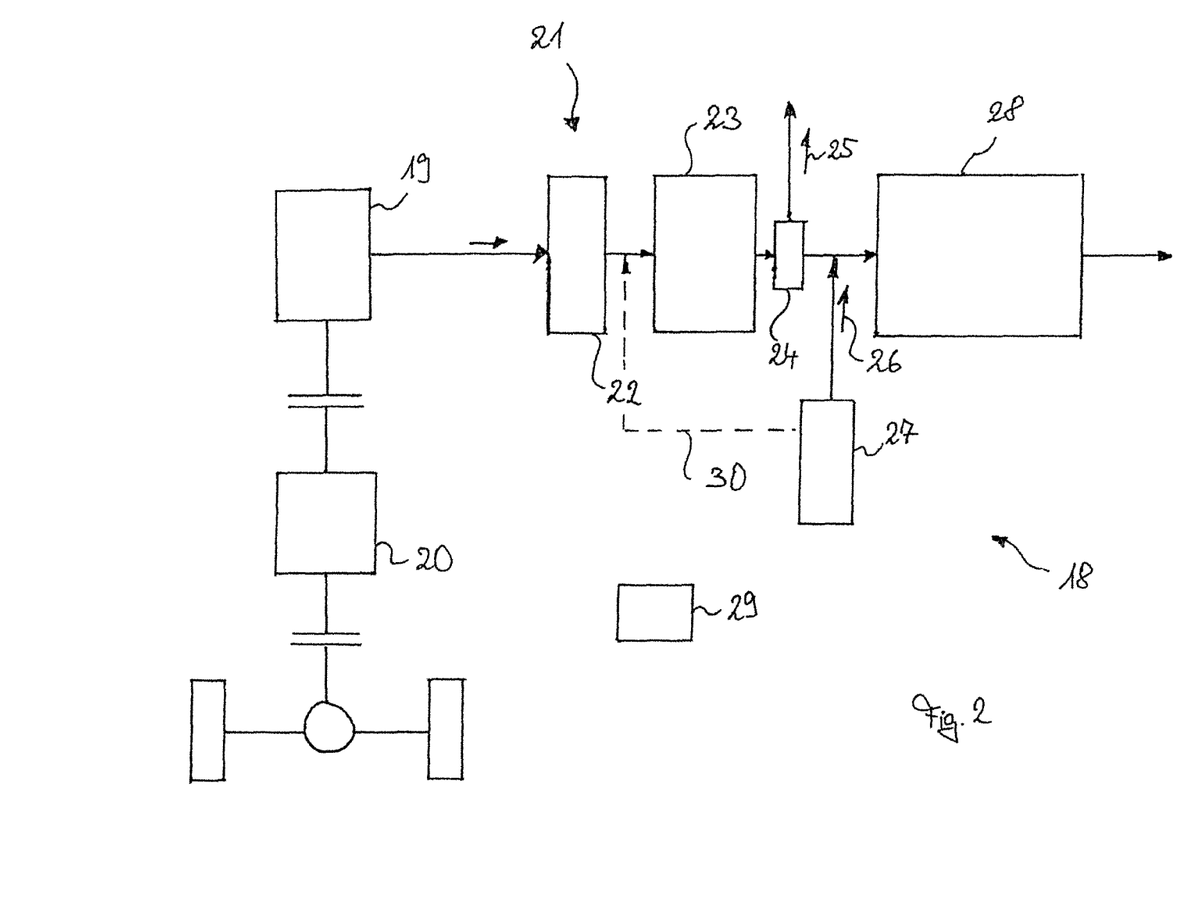

Another exemplary design of a second vehicle 18 is depicted in FIG. 2. This is likewise designed, by way of example, as a hybrid vehicle, wherein the second vehicle also exhibits a second internal combustion engine 19 and a second electric motor 20. In particular, the second vehicle 18 can be operated in the same manner, with respect to the drive train, as the first vehicle. There is, however, also the possibility that an operating manner of the second vehicle 18 deviates from that of the vehicle depicted in FIG. 1. The second vehicle 18 exhibits a second exhaust system 21. An oxidation catalytic converter 22 is disposed therein in the vicinity of the internal combustion engine 19. A second exhaust flow flows through this, indicated by the arrow. A diesel particle filter 23 is disposed downstream of the oxidation catalytic converter 22. This enables, for example, a flow routing device 24 to follow the diesel particle filter 23. The flow routing device 24 is, for example, an exhaust valve or an exhaust return valve. According to one design, it is provided, for example, that a portion of the partial mass flow 25 flowing through the oxidation catalytic converter 22 and the diesel particle filter 23, indicated by the arrow, is returned by means of this valve to the second internal combustion engine 19. This can occur, for example, in the framework of a low-pressure exhaust return system. The remaining exhaust flow is thus enriched with a reformate 26, which is made available from a reformer 27. The reformate 26 mixes with the partial flow during the dosing, and the mixture is then supplied to a nitrogen oxide storage catalytic converter 28. The operation of the reformer 27 can, in turn, occur by means of an electric or motor control unit 29. In particular, the reformate injection of the reformate 26 can be timed in terms of its quantity, but also with respect to the injection pressure, such that the reformate is reliably implemented entirely in the course of the reduction. A discharge of not fully reduced reformate in the nitrogen oxide storage catalytic converter 28 is prevented by this means.

With the second vehicle 18, it is also provided that the regeneration of the nitrogen oxide storage catalytic converter preferably occurs at a point in time when a flow rate is significantly reduced, if not actually occurring at least shortly before the standstill. As a result, the available reaction time can be optimized. The supplying of the reformate 26 can, for example, occur with an exhaust flow that has not been divided, flowing from the internal combustion engine 19. There is, however, also the possibility that, through the use of, for example, the flow routing element 24, in the form of an AGR valve, for example, and in particular, a return in the region of the exhaust return system, a mixing with just one partial exhaust flow is provided for. In particular, a return of a partial mass flow 25 can be coordinated to a supplying of the reformate 26 thereto, by means of the motor control unit 29, for example.

Furthermore, it is advantageous if the nitrogen oxide storage catalytic converter is subjected to a flow of the reformate, or the mixture of reformate and exhaust, if possible, from the beginning onward, over the entire front surface thereof. For this, it is provided, for example, that a sufficient mixing path, in particular, a mixture conveyor, can be provided prior to the nitrogen oxide storage catalytic converter in the flow direction. This can be a mixer, for example, which homogenizes the mixture. Another design provides, for example, that with respect to the front surface of the nitrogen oxide storage catalytic converter, a reformate distribution in the flow cross-section adapted thereto is supported. Thus, a larger partial reformate flow can, for example, be provided in an external border region of the nitrogen oxide storage catalytic converter. It is also possible, however, for a larger volume flow of the supplied reformate to be present in an internal region of a front surface of the nitrogen oxide storage catalytic converter.

Furthermore, there is the possibility that the reformer 27 provides reformate for not only the regeneration of the nitrogen oxide storage catalytic converter 28. Instead, there is also the possibility that the reformer 27 generates reformate for regenerating the particle filter 23. This is indicated by the broken line arrow, as a supplying of further reformate 30. With respect to a reformate treatment of this type,—supplying as well as regenerating a particle filter, reference is made, by way of example, to the contents of DE 103 411 43, the contents of which, referring to this, belong in full to the disclosure contents of this invention.

Furthermore, a bypass for the nitrogen oxide storage catalytic converter 28 can be provided. In particular when idling, this enables a regeneration that can be enabled, independently of the internal combustion engine, via the reformate dosing. This bypass can, for example, be created by means of the flow routing element 24, if the supplying of the reformate 26 occurs upstream thereof. The bypass can, however, bypass the nitrogen oxide storage catalytic converter exclusively.

Figure 3:
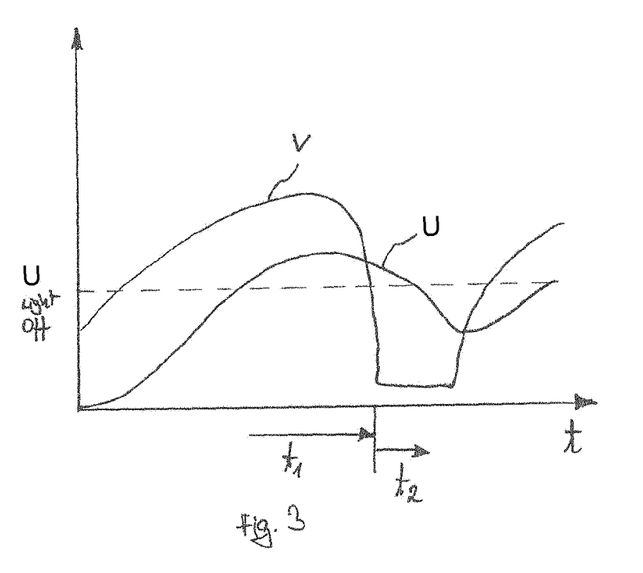

FIG. 3 shows, in an exemplary schematic depiction, on possibility for how a regeneration program such as that proposed above, functions. For this, the time is mapped on the x-axis of an x,y diagram, and the flow rate V of the exhaust, on one hand, and a temperature U of the nitrogen oxide storage catalytic converter, on the other, is mapped on the y-axis. Furthermore, the light-off temperature is entered on the y-axis, which represents a limit, in particular with regard to the reduction agent supplied thereto, which first when exceeded, enables a reduction within the nitrogen oxide storage catalytic converter. As depicted, a heating phase of the nitrogen oxide storage catalytic converter occurs at the start. This is carried out by means of the exhaust flow coming from the internal combustion engine. When the temperature reaches the light-off temperature, and exceeds it, this is determined, for example, by means of the motor control unit and/or can be anticipated by it, for example. If the internal combustion engine then enters an idle range, which is indicated here by the reduction in speed, a second time period $t_2$ is obtained in addition to the first time period $t_1$, in which the flow rate in the nitrogen oxide storage catalytic converter decreases significantly. At this point in time, the regeneration of the nitrogen oxide storage catalytic converter can be carried out in an advantageous manner, in particular with lower amounts of regeneration agent. The supplying of the regeneration agent can, if applicable, already occur during the decrease in the flow rate, and prior to detecting an idle phase. It can, however, likewise also first occur at a point in time, in which the idle phase has continued over the course of a certain minimum period of time.

Figure 4:
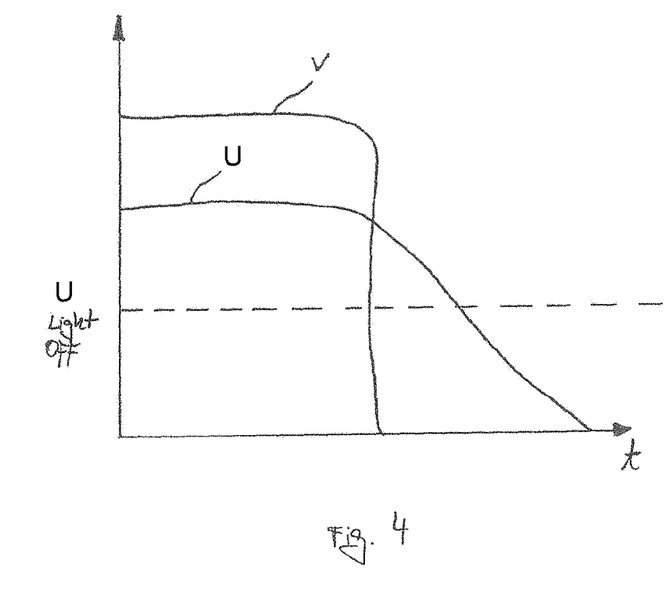

FIG. 4 shows, in an exemplary design, another constellation, in which the obtaining of a regeneration occurs in a time period in which a flow rate has significantly decreased in the nitrogen oxide storage catalytic converter. As in FIG. 3, an x,y diagram is also depicted in FIG. 4. The axes in FIG. 4 are the same as in FIG. 3. In FIG. 4, however, the situation when the internal combustion engine is at a standstill is depicted with respect to the situation in the nitrogen oxide storage catalytic converter. The flow rate V decreases significantly here, and becomes, in fact, 0. The temperature U of the nitrogen oxide storage catalytic converter, on the other hand, remains above the light-off temperature for a longer period of time, due to the heat capacity of the material from which the nitrogen oxide storage catalytic converter is made. A regeneration is therefore possible, as long as a light-off temperature is still exceeded. It must be ensured, however, that the reduction agent is sufficiently distributed in the nitrogen oxide storage catalytic converter, despite the standstill and the speed of the exhaust flow that is already approaching zero. This can, for example, be obtained by means of a follow-up by an exhaust turbine, through reducing the pressure in an exhaust routing path to that of atmospheric pressure, or by some other means. If, for example, a pressure is used, that is greater than the atmospheric pressure, which is still contained in the exhaust routing path, the exhaust return valve is opened, and instead of supplying exhaust to the internal combustion engine, the exhaust contained in the exhaust routing path is then fed into the atmosphere by means of the nitrogen oxide storage catalytic converter. In this case, this discharged exhaust flow can be enriched with reformate for regeneration.

The invention claimed is:

1. A method for regenerating a nitrogen oxide storage catalytic converter, used in a vehicle having an internal combustion engine, which is operated in different operating ranges, the method comprising:
   providing a nitrogen oxide storage catalytic converter;
   providing an oxidation catalytic converter upstream of the nitrogen oxide storage catalytic converter in a direction of an exhaust flow;
   monitoring a temperature of the nitrogen oxide storage catalytic converter to ensure a sufficient operating temperature for its regeneration;
   providing a reformer that generates a gaseous reformate including H2/CO having no or only a very low HC portion, the reformer injects the gaseous reformate at a position downstream of the oxidation catalytic converter and upstream of the nitrogen oxide storage catalytic converter in the direction of the exhaust flow; and
   initiating a regeneration of the nitrogen oxide storage catalytic converter using the gaseous reformate at a point in time in which a flow rate of an exhaust flow through the nitrogen oxide storage catalytic converter has at least decreased in comparison to an immediately preceding time period and when the temperature of the nitrogen oxide storage catalytic converter is lower than 200° C.

2. The method according to claim 1, wherein the regeneration occurs when the internal combustion engine is at rest and/or is idling.

3. The method according to claim 1, wherein the regeneration occurs during the stop segment of an automatic start-stop function.

4. The method according to claim 3, wherein the regeneration occurs during a coasting modal state of the vehicle.

5. The method according to claim 1, wherein the regeneration occurs when the internal combustion engine has been shut off, after parking the vehicle.

6. The method according to claim 1, wherein a reduction agent generation, independent of the internal combustion engine, is used, in order to further supply a reduction agent for regenerating the nitrogen oxide storage catalytic converter, at least when the internal combustion engine is at rest.

7. A vehicle having an internal combustion engine for operation in different operating ranges, the vehicle comprising:
   an exhaust post-treatment, which includes an oxidation catalytic converter upstream of at least one nitrogen oxide storage catalytic converter in a direction of an exhaust flow;
   a reformer that provides a gaseous reformate including H2/CO having no or only a very low HC portion, the reformer injects the gaseous reformate in an exhaust system at a position downstream of the oxidation catalytic converter and upstream of the nitrogen oxide storage catalytic converter in the direction of the exhaust flow; and
   an electronic control unit having a stored regeneration program for the nitrogen oxide storage catalytic converter, the electronic control unit executes the stored regeneration program to initiate a regeneration of the nitrogen oxide the storage catalytic converter at a point in time in which a flow rate of an exhaust flow through the nitrogen oxide storage catalytic converter has decreased in comparison to an immediately preceding time period and when the temperature of the nitrogen oxide storage catalytic converter is lower than 200° C.

8. The vehicle according to claim 7, wherein an additional catalytic converter, in which an oxygen storage capacity or a reduction agent storage capacity for compensating for a reduction agent slip is provided, following the nitrogen oxide storage catalytic converter, as seen in the direction of the exhaust flow.

9. The vehicle according to claim 7, wherein the regeneration program exhibits a triggering of the regeneration when it has been detected that the internal combustion engine is at rest.

10. The vehicle according to claim 7, wherein a bypass for bypassing the nitrogen oxide storage catalytic converter is provided, which is put in use during an idling of the internal combustion engine.

* * * * *